(12) United States Patent
Olsen

(10) Patent No.: US 11,845,554 B2
(45) Date of Patent: Dec. 19, 2023

(54) DRONE PAYLOAD RELEASE ASSEMBLY

(71) Applicant: Arthur J. Olsen, Paoli, PA (US)

(72) Inventor: Arthur J. Olsen, Paoli, PA (US)

(*) Notice: Subject to any disclaimer, the term of this patent is extended or adjusted under 35 U.S.C. 154(b) by 1187 days.

(21) Appl. No.: 16/517,517

(22) Filed: Jul. 19, 2019

(65) Prior Publication Data
US 2020/0023972 A1 Jan. 23, 2020

Related U.S. Application Data

(60) Provisional application No. 62/700,648, filed on Jul. 19, 2018.

(51) Int. Cl.
*B64D 1/08* (2006.01)
*B64D 1/12* (2006.01)
*B64U 101/15* (2023.01)
*B64U 101/60* (2023.01)

(52) U.S. Cl.
CPC ............ *B64D 1/12* (2013.01); *B64U 2101/15* (2023.01); *B64U 2101/60* (2023.01)

(58) Field of Classification Search
CPC ........ B64D 1/08; B64D 1/12; B64U 2101/15; B64U 2101/60; B64C 39/024; Y10T 74/18; Y10T 74/18056
See application file for complete search history.

(56) References Cited

U.S. PATENT DOCUMENTS 10,744,649 B2 * 8/2020 Lewis .................... B64U 10/13

FOREIGN PATENT DOCUMENTS

| CH | 717981 | A2 | * | 4/2022 | ........... | B64C 39/024 |
| CN | 108001686 | A | * | 5/2018 | ........... | B64C 39/024 |
| CN | 107963217 | B | * | 2/2021 | ........... | B64C 39/024 |
| CN | 113844656 | A | * | 12/2021 | | |

* cited by examiner

*Primary Examiner* — Adam D Rogers
(74) *Attorney, Agent, or Firm* — Volpe Koenig

(57) ABSTRACT

A payload release assembly is disclosed. The payload release assembly includes a body defining a plurality of fingers each defining an opening. A plurality of payload retention pockets are defined between adjacent fingers of the plurality of fingers. A release pin is dimensioned to be received within the openings defined by the plurality of fingers. A motor is adapted to drive the release pin into engagement and out of engagement with the openings defined by the plurality of fingers, such that payloads secured within the payload retention pockets are released from the payload release assembly when the motor drives the release pin out of engagement with a respective opening defined by the plurality of fingers.

20 Claims, 7 Drawing Sheets

DRONE PAYLOAD RELEASE ASSEMBLY

INCORPORATION BY REFERENCE

The following document is incorporated herein by reference as if fully set forth: U.S. Provisional Patent Application No. 62/700,648, filed Jul. 19, 2018.

BACKGROUND

Drones and other aerial unmanned devices are well known. Drones have been adapted to provide many different purposes, including payload delivery. Payload delivery is particularly important for retail based services that wish to more quickly deliver products to consumers. However, adapting a drone to interface with payload release assemblies is complicated and requires significant reconfiguration of the drone to interface with a specific payload release assembly. Known drone payload release assemblies are also limited in terms of the quantity of payloads that can be supported and delivered by a single payload release assembly.

It would be desirable to provide a reliable drone payload release assembly that is capable of carrying multiple payloads.

SUMMARY

A payload release assembly is disclosed that provides an improved capacity for retaining payloads and a reliable payload release mechanism. The payload release assembly includes a body defining a plurality of fingers each defining an opening. A plurality of payload retention pockets are defined between adjacent fingers of the plurality of fingers. A release pin is dimensioned to be received within the openings defined by the plurality of fingers. A motor is adapted to drive the release pin into engagement and out of engagement with the openings defined by the plurality of fingers, such that payloads secured within the payload retention pockets are released from the payload release assembly when the motor drives the release pin out of engagement with a respective opening defined by the plurality of fingers. The motor is configured to be selectively driven such that the release pin progressively disengages from the openings defined by the plurality of fingers.

In one embodiment, the payload release assembly also includes a linkage connected to the motor and engaged with the release pin. An attachment assembly that is adapted to mount the payload release assembly onto a drone can also be included. The attachment assembly can include two clamps arranged on opposite ends of the body, and the two clamps can each define an opening adapted to receive a portion of the drone.

The quantity of fingers can be varied depending on the desired quantity of payloads to be retained by the payload release assembly.

In one embodiment, the motor includes a circuit adapted to connect to a drone's power source. The circuit can include a power step-down circuit and a power split circuit.

The body of the payload release assembly preferably includes the attachment assembly on an upper surface, the fingers on a bottom surface, and a mounting bracket dimensioned to support the motor on the bottom surface.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the invention. In the drawings.

DETAILED DESCRIPTION OF THE PREFERRED EMBODIMENTS

Figure 1:
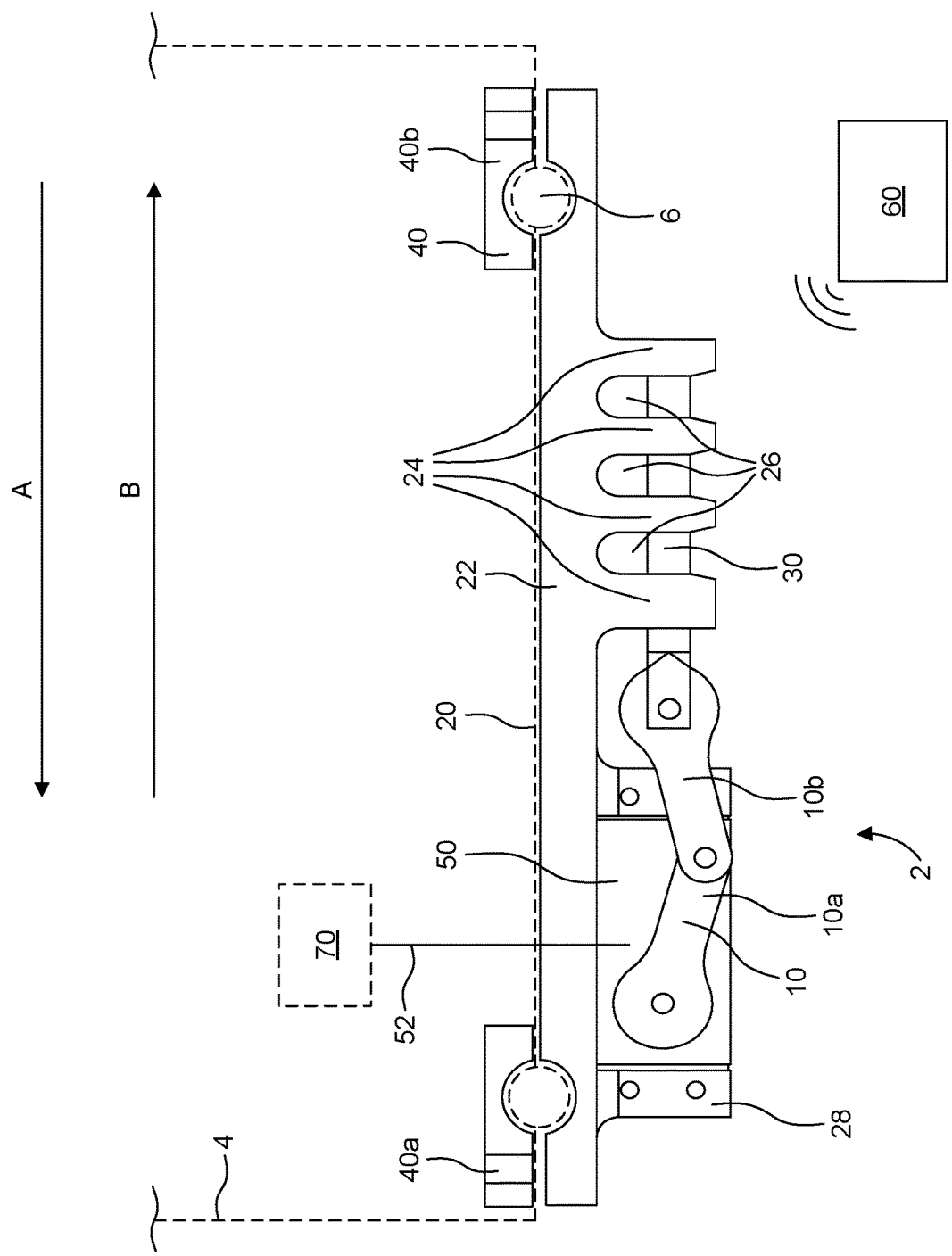
FIG. 1 is a side view of a payload release assembly according to one embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A payload release assembly 2 is generally disclosed and shown in FIGS. 1-4. The payload release assembly 2 includes a linkage 10, a body 20, release pin 30, attachment assembly 40, and motor 50.

The payload release assembly 2 is configured to be attached to a mobile component, for example an unmanned aerial device or drone, which is illustrated as element 4 in phantom lines in FIG. 1. One of ordinary skill in the art would understand that the payload release assembly 2 can be attached any type of vehicle or device.

Figure 4:
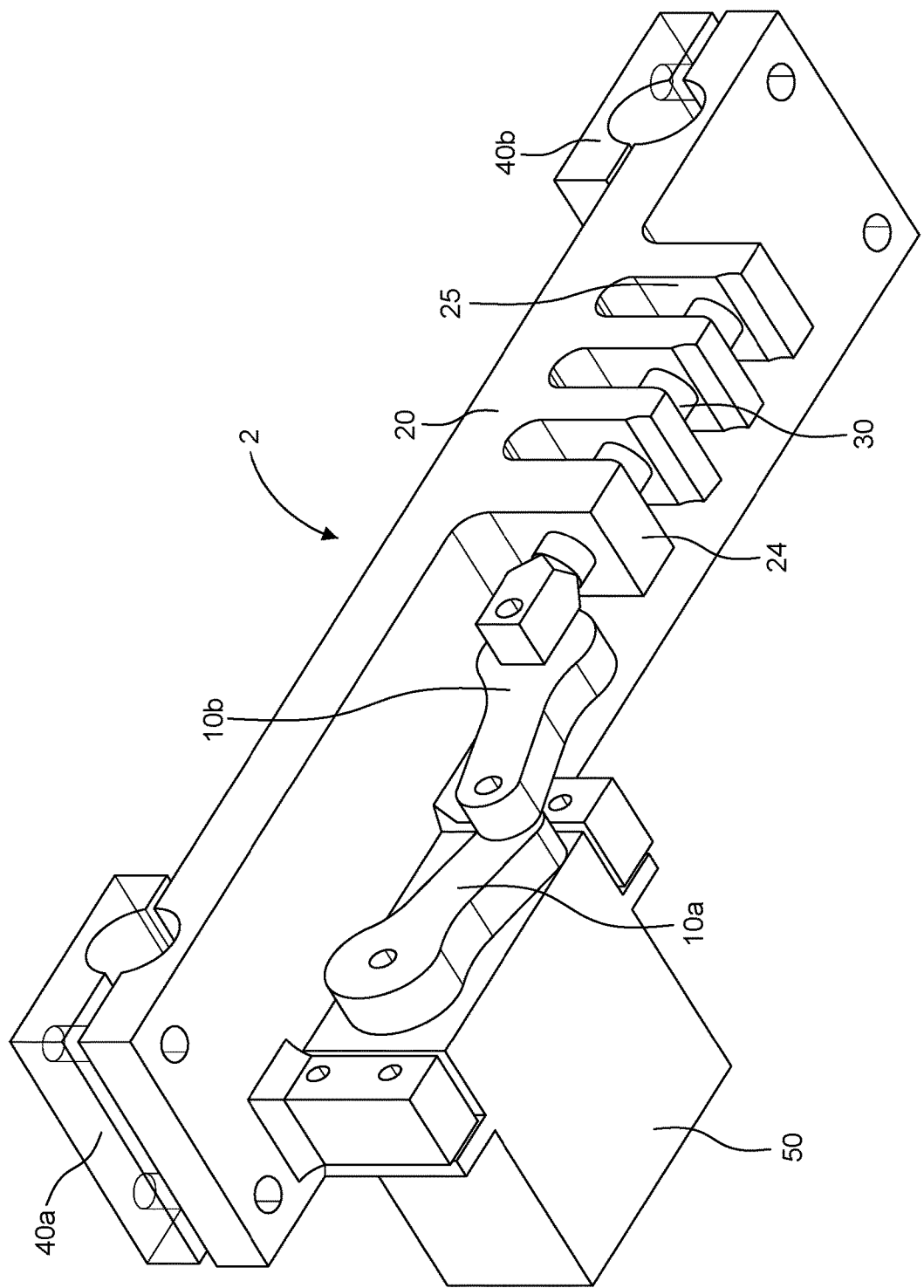
FIG. 4 is a bottom perspective view of the payload release assembly of FIGS. 1-3.

The attachment assembly 40 is preferably defined on a first side of the payload release assembly 2. As shown in FIG. 1, the attachment assembly 40 is defined on a top or upper surface of the payload release assembly 2. In one embodiment, the attachment assembly 40 includes a plurality of clamps 40a, 40b, as illustrated in FIGS. 1 and 4. In one embodiment, the clamps 40a, 40b define openings, which are dimensioned to receive a portion of a drone, e.g. a rail or bar 6 of the drone, as shown in FIG. 1. The clamps 40a, 40b provide a convenient and easily releasable connection for the payload release assembly 2 with the drone.

The body 20 includes a generally planar base 22. The clamps 40a, 40b directly attach to a top surface of the base 22. The body 20 also defines a plurality of fingers 24. As shown in FIG. 1, the plurality of fingers 24 extend from a bottom surface of the base 22. The body 20 also defines a mounting bracket 28 dimensioned to receive the motor 50.

Figure 2:
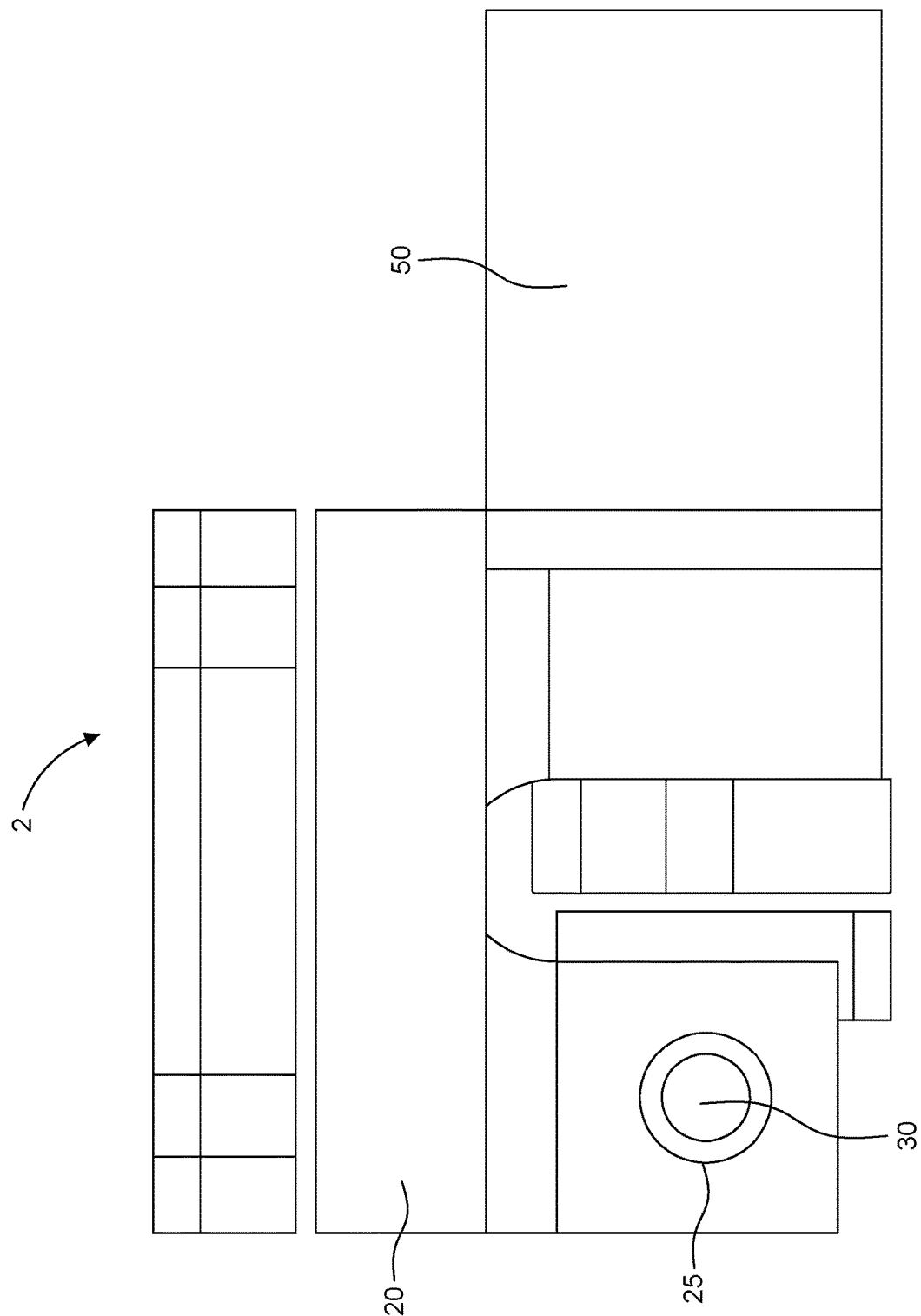
FIG. 2 is a front view of the payload release assembly of FIG. 1.

As shown in FIGS. 2 and 4, the fingers 24 each define an opening 25, which is dimensioned to receive the release pin 30. The release pin 30 and the openings 25 are illustrated as being circular, however one of ordinary skill in the art would understand that the shape, size and dimension of these components can be varied as long as the release pin 30 can be received within the openings 25. The release pin 30 is dimensioned such that it can slide inside the openings 25 of each of the fingers 24.

The linkage 10 is in direct connection with the motor 50. The linkage 10 is illustrated with two arms 10a, 10b in the drawings, but one of ordinary skill in the art would understand that any type of linkage 10 could be used. In one embodiment, the linkage 10 translates rotary motion from the motor 50 into linear movement of the release pin 30. However, one of ordinary skill in the art would understand that other driving mechanisms could be used that rely on direct displacement or movement of the release pin 30 via the motor 50.

In one embodiment, the motor 50 is a servo-motor. One of ordinary skill in the art would recognize that any type of motor could be used, such as a solenoid or other actuator. One of ordinary skill in the art would understand that the motor 50 or driving mechanism could be magnetically driven. The motor 50 is configured to receive wireless signals from a remote controller 60. The motor 50 includes electronic components, e.g. a central processing unit, input/output interface, memory, controller, etc., for receiving and transmitting signals to a remote device or server. A user can input commands to the remote controller 60 to control the motor 50. For example, the user can control the motor 50 via the remote controller 60 such that the release pin 30 is driven a first distance, second distance, third distance, etc.

Figure 3:
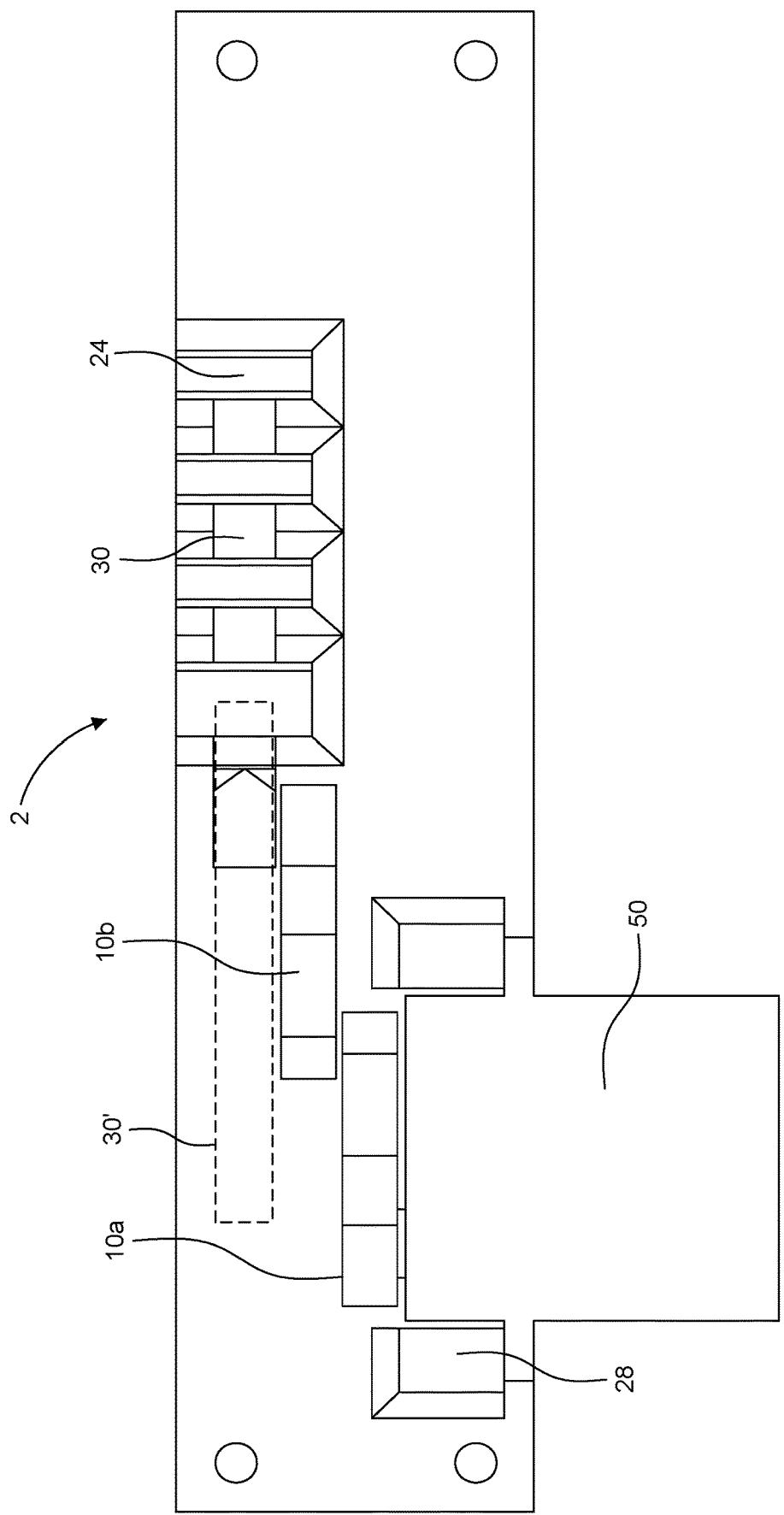
FIG. 3 is a bottom view of the payload release assembly of FIGS. 1 and 2.

Payloads, such as life vests, wires or cables, packages or any other item, are positioned within pockets 26 ("payload retention pockets") defined between the fingers 24 while the release pin 30 is disengaged from the openings 25. The payloads can be loaded directly into the pockets 26 or straps or harnesses can be provided that are attached to the payloads. After positioning the payloads in the payload retention pockets 26 defined between the fingers 24, the release pin 30 is then driven through the openings 25 (in direction B illustrated in FIG. 1) such that the payloads are secured within the payload retention pockets 26 between the fingers 24 via the release pin 30. The release pin 30 is illustrated in the "engaged" position in FIGS. 1-4. As used herein, the term engaged position means the release pin 30 extends through the openings 25 defined by the fingers 24. To release the payloads secured on the release pin 30, the motor 50 drives the release pin 30 out of engagement with the openings 25 and the fingers 24. As the release pin 30 moves in the A direction, the release pin 30 will progressively disengage from the openings of the fingers 24. The position of the release pin 30' in the disengaged state is illustrated in phantom lines in FIG. 3. As shown in FIG. 3, the release pin 30' is still positioned within the first finger 24 in the disengaged position. This ensures that the release pin 30' remains aligned with the openings 25 in the disengaged position.

Progressive disengagement of the release pin 30 from the openings 25 allows the payload release assembly 2 to selectively deliver payloads, such that a single payload is delivered at a time. A user can selectively control the movement of the release pin 30 via the remote controller 60, such that the payload release assembly 2 drops a first payload in a first location and the drone can fly to a second location to drop a second payload. The remote controller 60 can include buttons or controls that allow a user to select delivering one payload, two payloads, three payloads, etc.

The arrangement of the payload release assembly 2 provides a simplified payload delivery system since the release pin 30 is only linearly driven. Although the remote controller 60 is illustrated as a standalone element in FIG. 1, one of ordinary skill in the art would understand that the controls for payload release assembly 2 can be integrated within an existing drone control device.

Three pockets 26 are illustrated between the fingers 24, but one of ordinary skill in the art would understand that more or fewer pockets 26 can be included in the payload release assembly 2. The quantity of pockets 26 and fingers 24 of the payload release assembly 2 is only limited by the weight of the payloads, and the power/lifting capacity of the associated drone.

As best shown in FIG. 3, the mounting bracket 28 is offset from the fingers 24. This arrangement ensures that the release pin 30 has sufficient clearance to travel to the disengaged position without colliding with the motor 50 or the mounting bracket 28.

Figure 5:
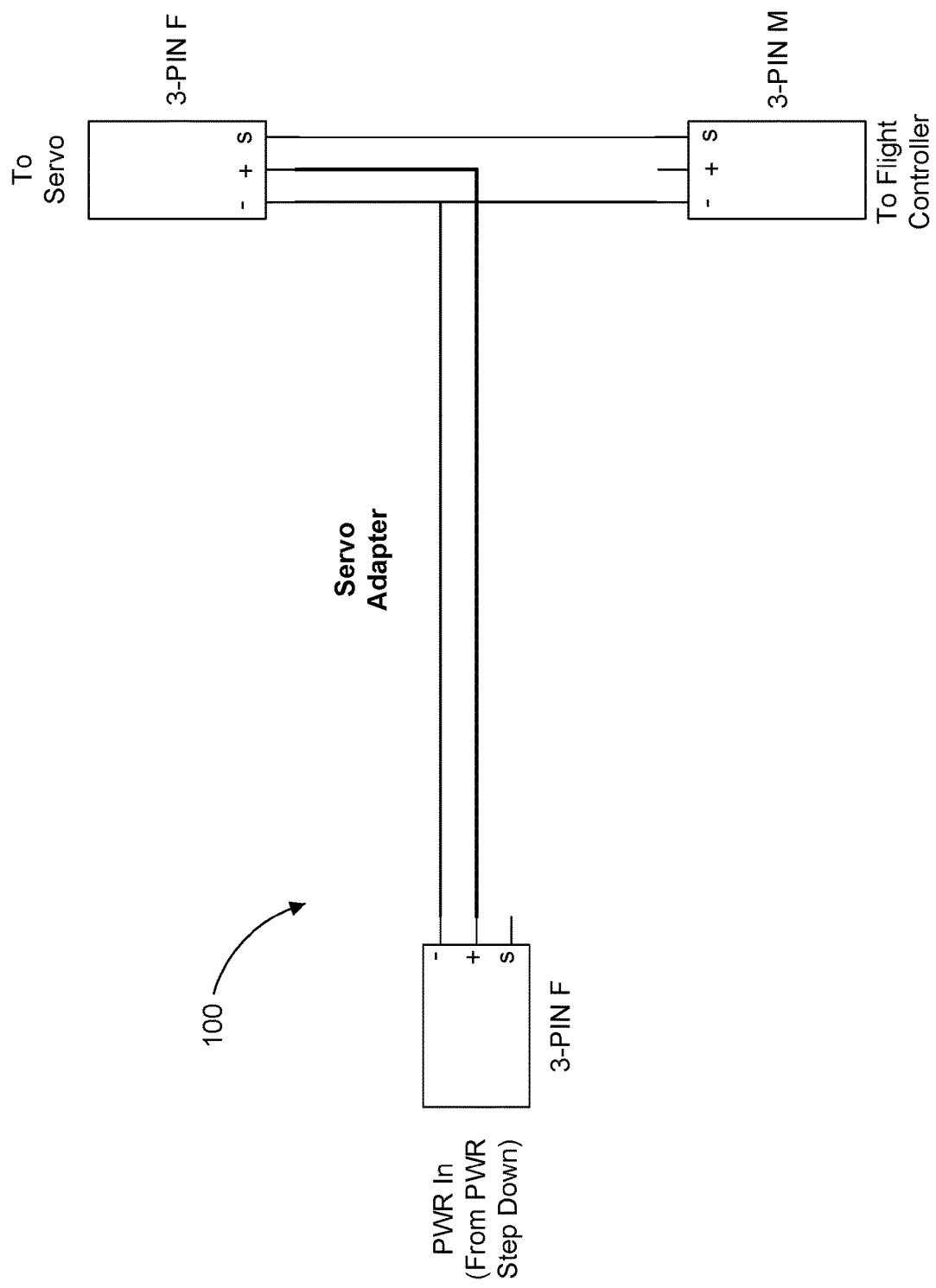
FIG. 5 is a schematic diagram of a circuit for a motor adapter.
Figure 6:
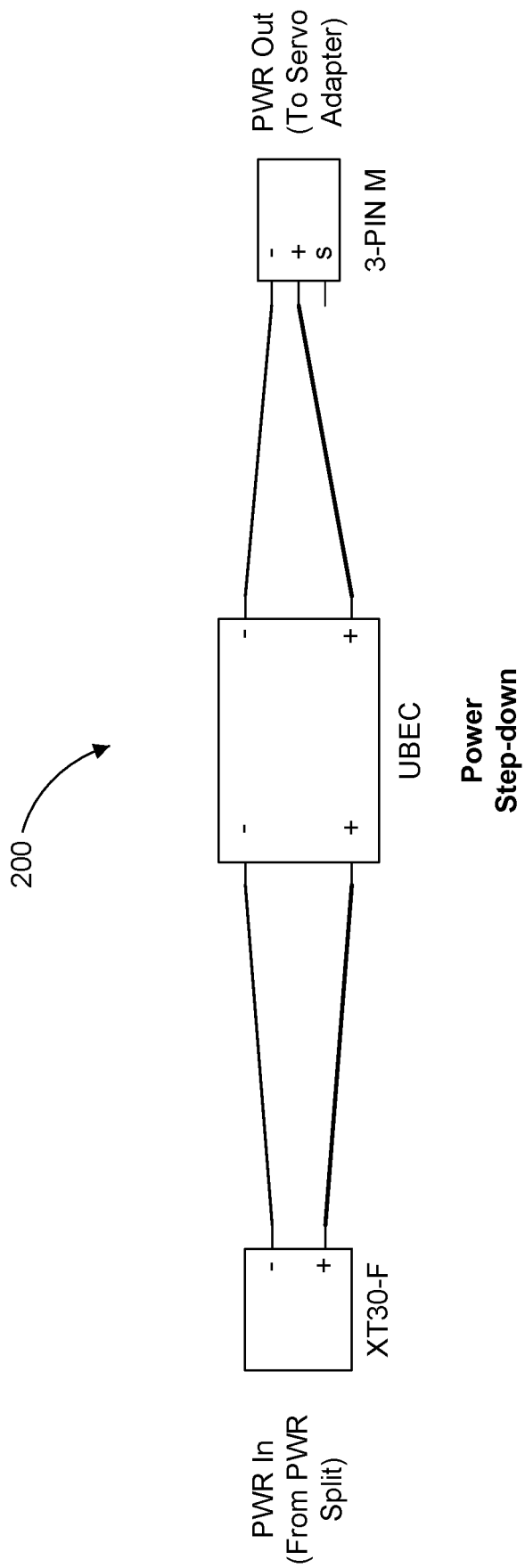
FIG. 6 is a schematic diagram of a power step-down for the motor.
Figure 7:
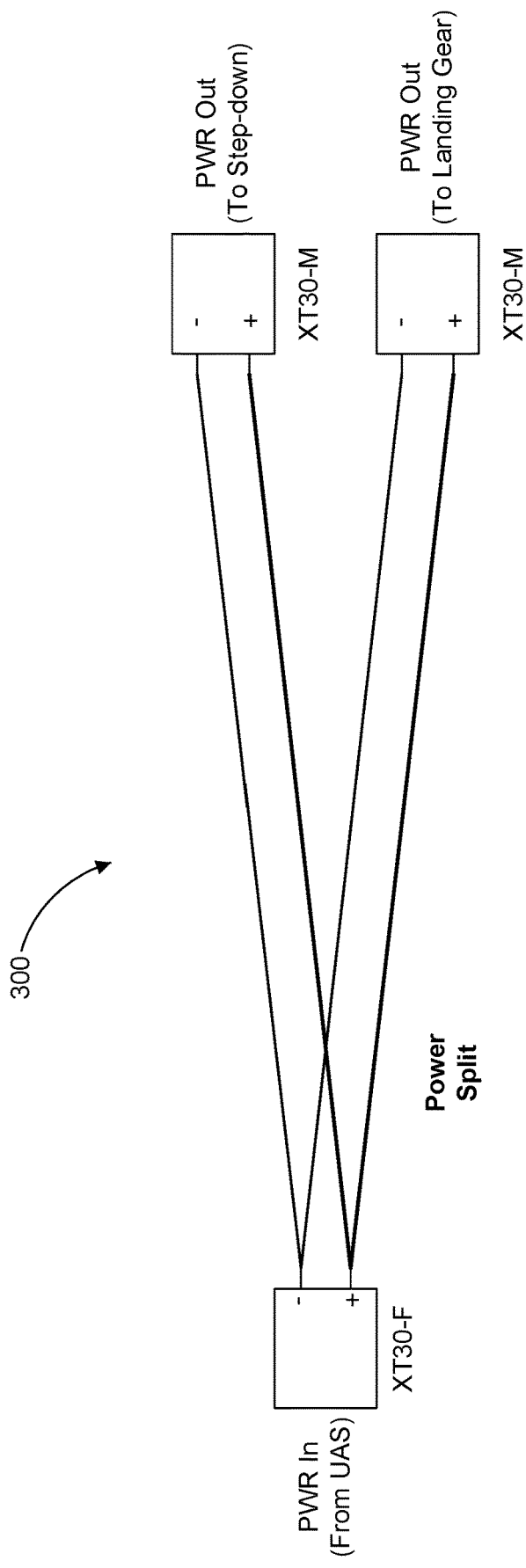
FIG. 7 is a schematic diagram of a power split circuit.

Circuit diagrams for the payload release assembly 2 are illustrated in FIGS. 5-7. The motor 50 for the payload release assembly 2 can be adapted to be driven via a power source associated with the drone that the payload release assembly 2 is attached onto. As shown in FIG. 1, the motor 50 is attached via a connection 52 to a drone's power source 70. In other embodiments, the motor 50 can be independently powered and not require a connection to a drone's power source 70.

As shown in FIG. 5, a circuit 100 is illustrated showing connections between the motor 50 (i.e. servo), a power input, and the flight controller connection of a drone. In one embodiment, the motor 50 is attached to a drone's power source, and more specifically can be attached to a drone's landing gear power source. In this embodiment, voltage from the drone's power source is stepped down from 18V to 5V. A transformer can be used to step down this voltage. This step down configuration is generally illustrated in FIG. 6 and circuit 200. FIG. 7 illustrates a circuit 300 showing a power split from a power input to a power output to a step-down, i.e. the motor 50 connection, and landing gear for the drone. Generally, the circuits 100, 200, 300 provide a configuration in which the payload release assembly 2, and more specifically the motor 50, is powered by an existing power source of the drone on which the payload release assembly 2 is attached. The circuits 100, 200, 300 provide a step down because the motor 50 generally requires much less power than the components of the drone. The circuits 100, 200, 300 disclosed herein are adapted to provide a simplified configuration for connecting the motor 50 to a drone's existing power source. The circuits 100, 200, 300 and the associated connections also do not require any destructive modifications of the drone's existing power source. This arrangement ensures that the drone remains generally unmodified and intact, and any warranties associated with the drone are not voided due to the connections required for powering the motor 50 of the payload release assembly 2.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A payload release assembly comprising:
   a body defining a plurality of fingers each defining an opening, and a plurality of payload retention pockets defined between adjacent fingers of the plurality of fingers;
   a release pin dimensioned to be received within the openings defined by the plurality of fingers; and
   a motor adapted to drive the release pin into engagement and out of engagement with the openings defined by the plurality of fingers, such that payloads secured within the payload retention pockets are released from the payload release assembly when the motor drives the release pin out of engagement with a respective opening defined by the plurality of fingers.

2. The payload release assembly of claim 1, further comprising a linkage connected to the motor and engaged with the release pin.

3. The payload release assembly of claim 1, further comprising an attachment assembly adapted to mount the payload release assembly onto a drone.

4. The payload release assembly of claim 3, wherein the attachment assembly includes two clamps arranged on opposite ends of the body, and the two clamps each define an opening adapted to receive a portion of the drone.

5. The payload release assembly of claim 1, wherein the plurality of fingers includes at least four fingers.

6. The payload release assembly of claim 1, wherein the motor includes a circuit adapted to connect to a drone's power source such that the motor is powered by the drone's power source.

7. The payload release assembly of claim 6, wherein the circuit includes a power step-down circuit and a power split circuit.

8. The payload release assembly of claim 1, further comprising an attachment assembly adapted to mount the payload release assembly onto a drone, the attachment assembly defined on an upper surface of the body, and the plurality of fingers extend from an opposite, bottom surface of the body.

9. The payload release assembly of claim 1, wherein the body further includes a mounting bracket dimensioned to support the motor.

10. The payload release assembly of claim 1, wherein the motor is configured to be selectively driven such that the release pin progressively disengages from the openings defined by the plurality of fingers.

11. The payload release assembly of claim 1, wherein the release pin is linearly driven by the motor.

12. A payload release assembly comprising:
    a body including a plurality of fingers each defining an opening, and a plurality of payload retention pockets defined between adjacent fingers of the plurality of fingers;
    an attachment assembly adapted to mount the payload release assembly onto a drone;
    a release pin dimensioned to be received within the openings defined by the plurality of fingers;
    a motor including a circuit adapted to connect to a drone's power source, the motor being adapted to drive the release pin into engagement and out of engagement with the openings defined by the plurality of fingers, such that payloads secured within the payload retention pockets are progressively released from the payload release assembly when the motor drives the release pin out of engagement with a respective opening defined by the plurality of fingers; and
    a linkage connected to the motor and engaged with the release pin.

13. The payload release assembly of claim 12, wherein the attachment assembly includes two clamps arranged on opposite ends of the body, and the two clamps each define an opening adapted to receive a portion of the drone.

14. The payload release assembly of claim 12, wherein the plurality of fingers includes at least four fingers.

15. The payload release assembly of claim 12, wherein the circuit includes a power step-down circuit and a power split circuit.

16. The payload release assembly of claim 12, wherein the motor is mounted to the body via a mounting bracket, and the mounting bracket is offset from an axis of the release pin.

17. The payload release assembly of claim 12, wherein the release pin remains engaged in the opening of one of the plurality of fingers in a disengaged position.

18. The payload release assembly of claim 12, wherein the release pin is linearly driven by the motor.

19. The payload release assembly of claim 12, wherein the linkage translates rotational motion of the motor into linear displacement of the release pin.

20. The payload release assembly of claim 12, further comprising a remote controller configured to transmit and receive signals from the motor.

* * * * *